United States Patent [19]
Miyano et al.

[11] Patent Number: 5,936,778
[45] Date of Patent: Aug. 10, 1999

[54] OBJECTIVE LENS FOR ENDOSCOPE

[75] Inventors: Hitoshi Miyano; Chikara Yamamoto, both of Omiya, Japan

[73] Assignee: Fuji Photo Optical Co., Ltd., Saitama, Japan

[21] Appl. No.: 09/036,781

[22] Filed: Mar. 9, 1998

[30] Foreign Application Priority Data

Mar. 19, 1997 [JP] Japan .................................... 9-086115

[51] Int. Cl.⁶ ................................................. G02B 13/18
[52] U.S. Cl. ........................ 359/660; 359/659; 359/661; 359/781
[58] Field of Search .................... 359/660, 644, 359/656, 657, 658, 659, 663, 790, 793, 795, 661, 784, 788, 645, 689, 716, 728, 781; 600/101, 109, 110, 112, 129, 160, 168; 348/45, 68; 356/241

[56] References Cited

U.S. PATENT DOCUMENTS

| | | | |
|---|---|---|---|
| 4,059,344 | 11/1977 | Yamasita | 350/226 |
| 4,976,522 | 12/1990 | Igarshi | 350/426 |
| 5,087,989 | 2/1992 | Igarashi | 359/692 |
| 5,175,650 | 12/1992 | Toshikazu | 359/716 |
| 5,198,931 | 3/1993 | Igarashi | 359/660 |
| 5,223,982 | 6/1993 | Suziki et al. | 359/716 |
| 5,296,971 | 3/1994 | Mori | 359/716 |
| 5,436,767 | 7/1995 | Suziki et al. | 359/716 |
| 5,828,498 | 10/1998 | Sekiya et al. | 359/660 |

FOREIGN PATENT DOCUMENTS 8-1222632  5/1996  Japan .

Primary Examiner—Georgia Epps
Assistant Examiner—David N. Spector
Attorney, Agent, or Firm—Snider & Chao LLP; Ronald R. Snider

[57] ABSTRACT

In a retro-focus type objective lens for an endoscope, its front-group concave lens system is constituted by two concave lenses, and a predetermined conditional expression is satisfied, so as to secure a sufficient length of back focus, while fully favorably correcting chromatic aberration in magnification. A four group lens configuration having five lenses comprising a front-group concave lens system composed of two concave lenses $L_1$ and $L_2$, a rear convex lens system composed of lenses $L_3$ and $L_5$, with an aperture stop interposed therebetween, in order to secure a long back focus at least three times the composite focal length of the whole system, satisfied is the following conditional expression:

$$dx \geq 3.0 \times |f_F| \qquad (1)$$

wherein $f_F$ is a composite focal length of the front-group concave lens system, and dx is a distance between a rear-side principal point of the front-group concave lens system and a front-side principal point of the rear-group convex lens system.

10 Claims, 12 Drawing Sheets

EXAMPLE 1

FIG.1

EXAMPLE 1

FIG.3

EXAMPLE 2

FIG.5
EXAMPLE 3

FIG.7
EXAMPLE 4

FIG. 9
EXAMPLE 5

F I G.11

COMPARATIVE EXAMPLE

OBJECTIVE LENS FOR ENDOSCOPE

RELATED APPLICATIONS

This application claims the priority of Japanese Patent Application No. 9-86115 filed on Mar. 19, 1997, which is incorporated herein by reference.

BACKGROUND OF THE INVENTION

1. Field of the Invention

The present invention relates to an objective lens disposed at a tip portion of an endoscope and, in particular, to an objective lens for an endoscope, in which a ray direction changing prism is placed on the image surface side thereof.

2. Description of the Prior Art

In a direct-vision type endoscope employing a solid-state imaging device, the latter is often axially inserted and disposed at the tip portion of the endoscope. In such an endoscope, a ray direction changing prism is inserted and disposed between its objective lens and solid-state imaging device in general.

Since the size of the ray direction changing prism is determined by the image size, it is necessary to fully secure the distance between the last surface of the objective lens and the imaging position between which the ray direction changing prism is inserted and disposed, i.e., back focus.

While the image size is reduced as the solid-state imaging device is made smaller, flare and ghost may occur unless a sufficient margin is provided for the distance between the prism wall surface and the effective luminous flux. Accordingly, in view of the processing accuracy of parts and their assembling accuracy, the above-mentioned distance cannot be shortened extremely, thus making it difficult to reduce the prism size in proportion to the image size. Consequently, an objective lens having a longer back focus as compared with its focal length is necessary.

However, in response to demands for wider angle, the objective lens for an endoscope tends to have shorter focal length even at the same image size, thus making it difficult to obtain sufficient back focus.

On the other hand, Japanese Patent Application No. 6-251976 Japanese Unexamined Patent Publication No. 8-122632) proposes an objective lens system, whose front-group concave lens system is composed of a single concave lens and a single convex lens, in which chromatic aberration in magnification is favorably corrected. This objective lens system, however, may be insufficient in terms of back focus.

SUMMARY OF THE INVENTION

In view of such circumstances, it is an object of the present invention to provide an objective lens for an endoscope, having a sufficient length of back focus in which a ray direction changing prism can be inserted and disposed between a solid-state imaging device axially disposed at a tip portion of the endoscope and the objective lens, while chromatic aberration in magnification is sufficiently favorably corrected.

The objective lens for an endoscope in accordance with the present invention is an objective lens comprising a front-group concave lens system, a rear-group convex lens system, and an aperture stop disposed therebetween;

wherein the front-group concave lens system is constituted by two concave lenses.

Further, the objective lens in accordance with the present invention satisfies the following conditional expression (1) and/or the following conditional expressions (2) and (3):

$$dx \geq 3.0 \times |f_F| \quad (1)$$
$$v_d > 50 \times (2.6 - n_d) \quad (2)$$
$$2.0 < f_2/f_1 < 4.0 \quad (3)$$

wherein $f_F$ is a composite focal length of the front-group concave lens system;

dx is a distance between a rear-side principal point of the front-group concave lens system and a front-side principal point of the rear-group convex lens system;

$v_d$ is an Abbe number of the second lens in the front-group concave lens system;

$n_d$ is a refractive index of the second lens in the front-group concave lens system at d-line;

$f_1$ is a focal length of the first lens in the front-group concave lens system; and $f_2$ is a focal length of the second lens in the front-group concave lens system.

Preferably, the rear-group convex lens system comprises, successively from the object side, a third convex lens having a surface with a small radius of curvature directed onto the image surface side, and a cemented lens composed of fourth and fifth lenses one of which is constituted by a convex lens while the other is constituted by a concave lens.

DESCRIPTION OF THE PREFERRED EMBODIMENTS

In the following, embodiments of the present invention will be explained with reference to Examples 1 to 5 and a comparative example.

EXAMPLE 1

Figure 1:
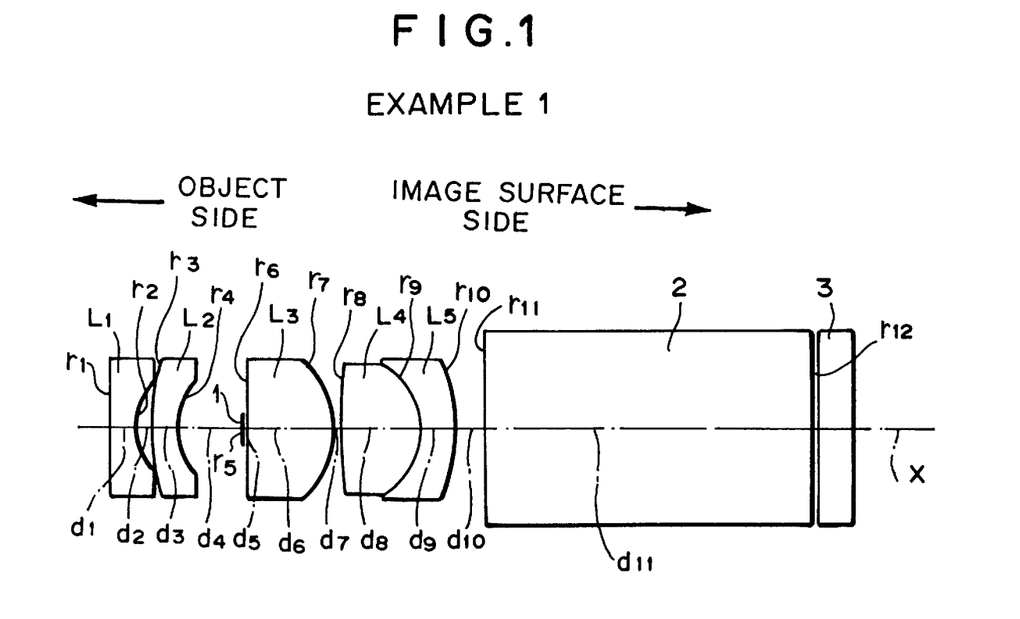
FIG. 1 is a lens configuration view showing the objective lens for an endoscope in accordance with Example 1 of the present invention.
Figures 2A, 2B, 2C, 2D, 2E:
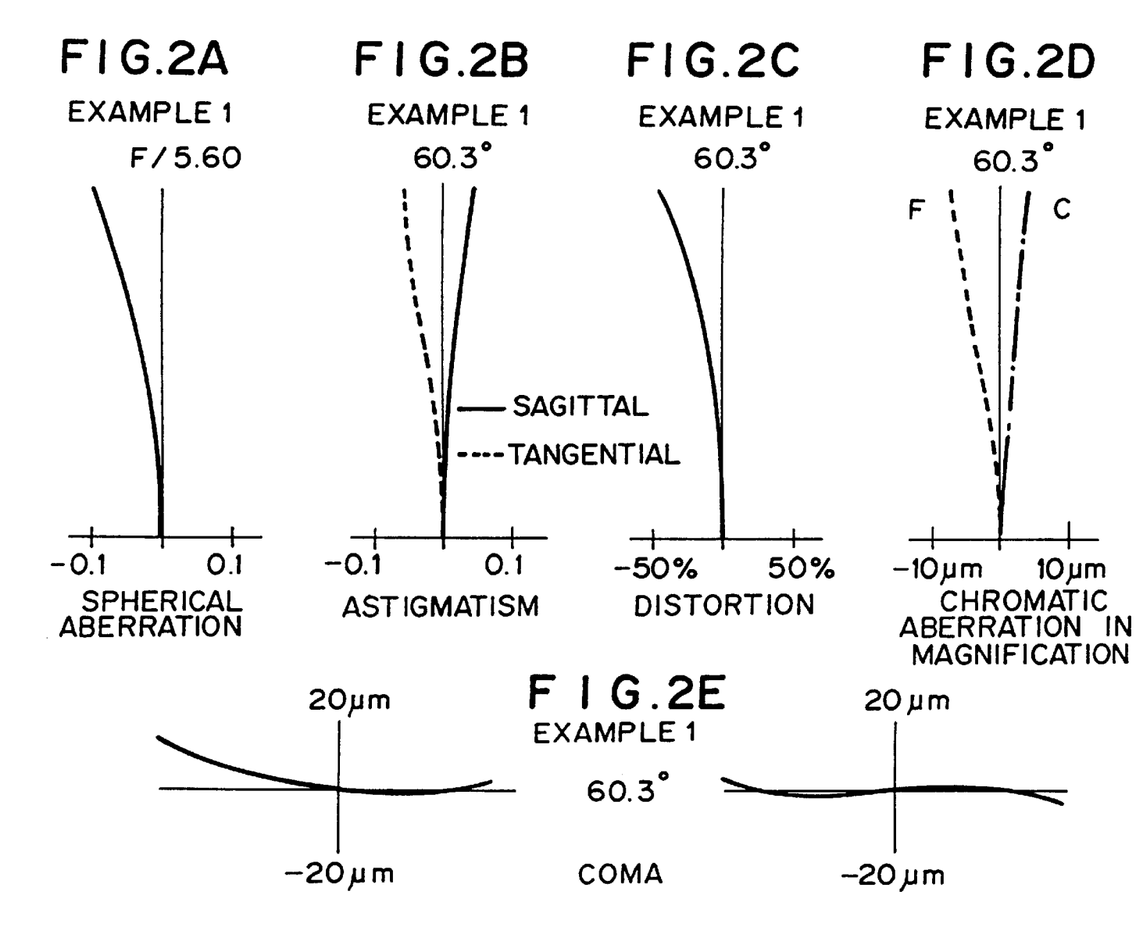
FIGS. 2A to 2E are aberration charts showing various kinds of aberration in the objective lens for an endoscope in accordance with Example 1 of the present invention.

FIG. 1 is a view showing the configuration of the objective lens for an endoscope in accordance with this example.

As depicted, this objective lens has a four-group retrofocus type lens configuration with five lenses. Namely, it comprises, successively from the object side, a first concave lens $L_1$ having a surface with a smaller radius of curvature directed onto the image surface side, a second concave lens $L_2$ having a surface with a smaller radius of curvature directed onto the image surface side, a third convex lens $L_3$ having a surface with a smaller radius of curvature directed onto the image surface side, a fourth lens $L_4$ made of a convex lens, and a fifth lens $L_5$ made of a concave lens, in which the fourth lens $L_4$ and the fifth lens $L_5$ constitute a cemented lens.

An aperture stop 1 (only its position on an optical axis X being depicted) is disposed in the vicinity of the third lens $L_3$ on the object side. The first and second lenses $L_1$ and $L_2$ constitute a front-group convex lens system, whereas the third, fourth, and fifth lenses $L_3$, $L_4$, and $L_5$ constitute a rear-group convex lens system, with the aperture stop 1 interposed therebetween. A ray direction changing prism 2 is disposed in the vicinity of the rear-group convex lens system on the image surface side, and a solid-state imaging device (CCD) 3 is placed in the vicinity of the ray direction changing prism 2 on the image surface side.

The objective lens is constituted so as to satisfy the following conditional expressions:

$$dx \geq 3.0 \times |f_F| \quad (1)$$

$$v_d > 50 \times (2.6 - n_d) \quad (2)$$

$$2.0 < f_2/f_1 < 4.0 \quad (3)$$

wherein $f_F$ is a composite focal length of the front-group concave lens system;

dx is a distance between a rear-side principal point of the front-group concave lens system and a front-side principal point of the rear-group convex lens system;

$\mu_d$ is an Abbe number of the second lens in the front-group concave lens system;

$n_d$ is a refractive index of the second lens in the front-group concave lens system at d-line;

$f_1$ is a focal length of the first lens in the front-group concave lens system; and $f_2$ is a focal length of the second lens in the front-group concave lens system.

The above-mentioned conditional expressions are set on the basis of the following reasons.

Conditional Expression (1)

This conditional expression is set for obtaining sufficient back focus.

In two sheets of thin lenses, their composite focal length f is represented by:

$$1/f = 1/f_a + 1/f_b - dx/(f_a f_b)$$

wherein $f_a$ is a focal length of one of the lenses, $f_b$ is a focal length of the other lens, and dx is a distance between the two lenses. Their back focus $B_f$ is represented by:

$$B_f = f(1 - dx/f_a).$$

Here, assuming that the back focus Bf is three times the composite focal length f, namely, $$Bf = 3f,$$

$$3f = f(1 - dx/f_a),$$

whereby $$dx = -2f_a.$$

In this example, assuming that $f_F$ is a composite focal length of the front-group concave lens system, and $f_R$ is a composite focal length of the rear-group convex lens system, $$f_F = f_a, f_R = F_b.$$

Since $f_F < 0$, fR>0, when $$dx \leq 2|f_F|,$$

$$B_f \geq 3f.$$

The foregoing relates to a case with thin lenses. In an actual optical system, since the composite rear-side principal point position of the rear-group convex lens system enters into the lens by substantially the composite focal length of the whole system, assuming that the value taking account of the principal point and back focus is (Bf)', when $$(Bf)' = 4f$$

is used in place of the above-mentioned expression $$Bf = 3f,$$

conditional expression:

$$dx \geq 3|f_F|$$

is obtained.

When this conditional expression is satisfied, a long back focus which is at least three times the composite focal length of the whole objective lens system can be secured.

Consequently, though the ray direction changing prism 2 is inserted and disposed between the solid-state imaging device 3 axially disposed at the tip portion of the endoscope and the objective lens, an image of an object can be formed on the solid-state imaging device 3.

Conditional Expression (2)

This conditional expression defines the glass material used for the second lens $L_2$ in the front-group concave lens system.

Namely, in the objective lens for an endoscope, while the glass material used for the first lens $L_1$ directly in contact with the exterior is limited to the one having excellent weather resistance and chemical resistance, thereby narrowing the degree of freedom in choice, the second lens $L_2$ has a certain degree of freedom.

In the objective lens for an endoscope, chromatic aberration in magnification in short wavelength tends to be on the under side. In order to correct this tendency, the concave lens located on the object side of the stop preferably has an Abbe number as great as possible. On the other hand, in order to correct coma, its refractive index is preferably as high as possible. This conditional expression indicates their relationship.

Conditional expression (3)

This conditional expression defines the ratio between the focal lengths of the first lens $L_1$ and the second lens $L_2$ in the front-group concave lens system.

Namely, it indicates that the first lens $L_1$ has a power stronger than that of the second lens $L_2$ by on the order of two to four times. When the second lens $L_2$ has a weak power, correction of chromatic aberration in magnification, which is the aimed object of the present invention, may become insufficient. When the second lens $L_2$ has a strong power, by contrast, the effect of the first lens $L_1$ for widening angle of view is weakened, thus failing to achieve wider angle of view.

Table 1 shows radius of curvature r (mm) of each lens surface, axial surface spacing d (mm) of each lens (center thickness of each lens and air gap between neighboring lenses), and refractive index $n_d$ and Abbe number $v_d$ at d-line of each lens in this example.

In Table 1, numbers denoting each letter successively increase from the object side, and each value of r and d is standardized for the case where the focal length is 1 mm.

TABLE 1

|    | r       | d      | $n_d$   | $v_d$ |
|----|---------|--------|---------|-------|
| 1  | ∞       | 0.4257 | 1.88300 | 41.0  |
| 2  | 0.9977  | 0.2271 |         |       |
| 3  | 3.5535  | 0.4257 | 1.62041 | 60.3  |
| 4  | 1.1041  | 0.9650 |         |       |
| 5  | Stop    | 0.0568 |         |       |
| 6  | ∞       | 1.3340 | 1.62041 | 60.3  |
| 7  | -1.3524 | 0.1419 |         |       |
| 8  | 12.6871 | 1.2347 | 1.62041 | 60.3  |
| 9  | -1.1041 | 0.4967 | 1.84666 | 23.8  |
| 10 | -2.6978 | 0.4500 |         |       |
| 11 | ∞       | 4.9665 | 1.53996 | 59.7  |
| 12 | ∞       |        |         |       |

Table 2 shows the image size, object distance, angle of view, back focus $B_f$, composite focal length and rear-side principal point position of the front-group concave lens system, front-side principal point position and rear-side principal point position of the rear-group convex lens system, and focal lengths of the first lens $L_1$ and the second lens $L_2$ in the front-group concave lens system obtained by the above-mentioned objective lens.

TABLE 2

| Image size | 1.840 mm (diameter) |
|---|---|
| Object distance | 8.5149 mm |
| Angle of view | 12° 33' |
| Bf = 3.567f | |
| Composite focal length of front-group concave lens system | :-0.6948 |
| Rear-side principal point position of front-group concave lens system | :-0.2610 |
| Front-side principal point position of rear-group convex lens system | :1.2075 |
| Rear-side principal point position of rear-group convex lens system | :-1.0441 |
| Focal length of first lens in front-group concave lens system | :-1.1298 |
| Focal length of second lens in front-group concave lens system | :-2.7658 |

From these values, dx, $v_d$, and $f_2/f_1$ are calculated as:

$$dx = 0.2610 + 1.0218 + 1.2075$$
$$= 2.4903$$
$$= 3.611 |f_F|$$

$v_d = 60.3 > 50 \times (2.6 - 1.62041) = 49.0$ $f_2/f_1 = 2.448$

It is clear that these values satisfy conditional expressions (1), (2), and (3).

FIG. 2A to 2E are aberration charts showing various kinds of aberration in the objective lens for an endoscope in accordance with this example.

These aberration charts show amounts of aberration at object heights of 60%, 80%, and 100% when the effective Fno is 5.60.

As can be seen from these charts, this example can yield an objective lens for an endoscope having favorable imaging performances extending to the periphery of its visual field.

EXAMPLE 2

Figure 3:
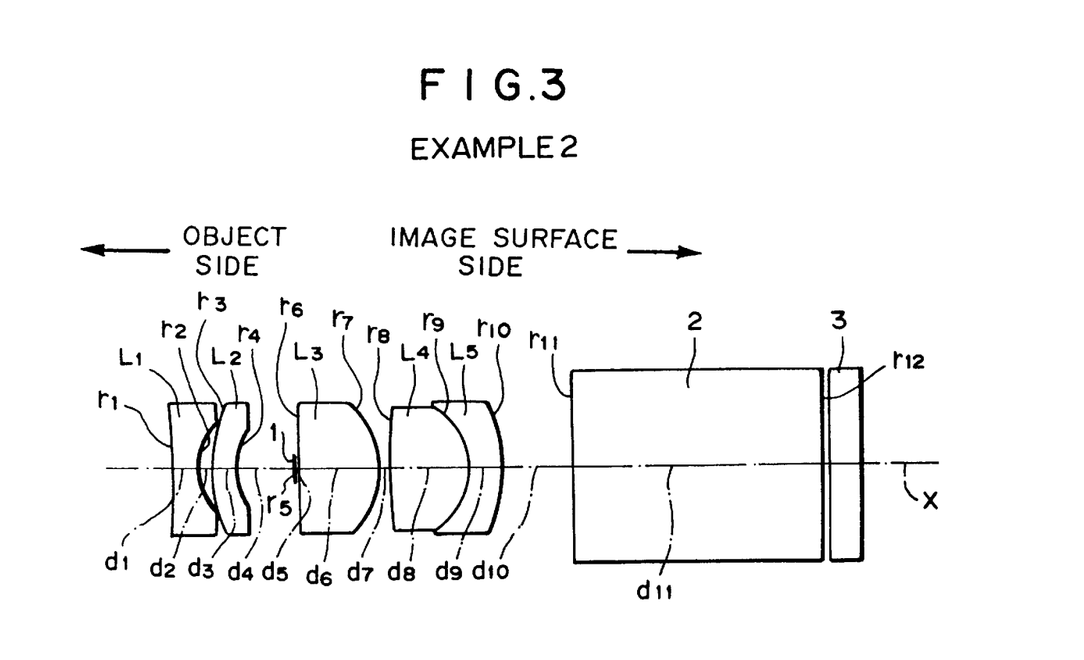
FIG. 3 is a lens configuration view showing the objective lens for an endoscope in accordance with Example 2 of the present invention.
Figure 4A:
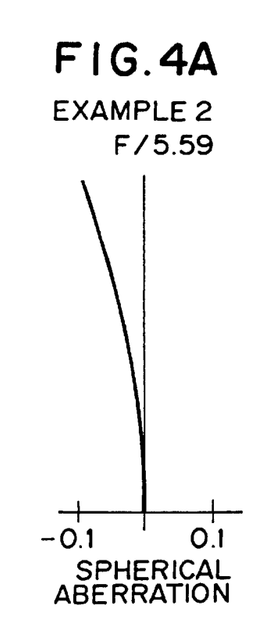
FIGS. 4A to 4E are aberration charts showing various kinds of aberration in the objective lens for an endoscope in accordance with Example 2 of the present invention.
Figures 4B, 4C:
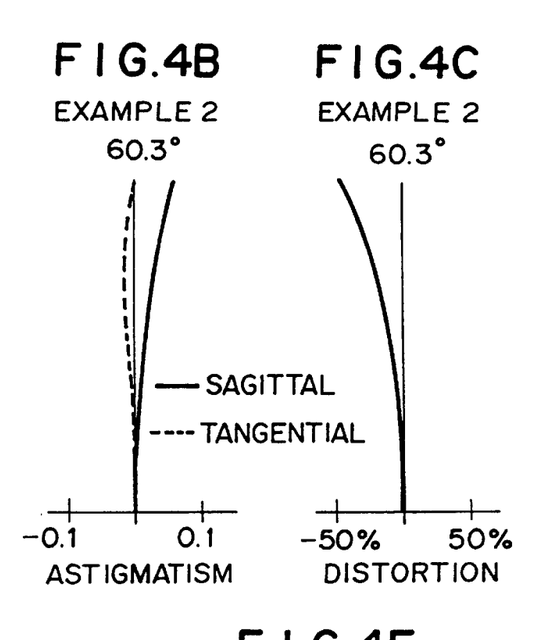
Figure 4D:
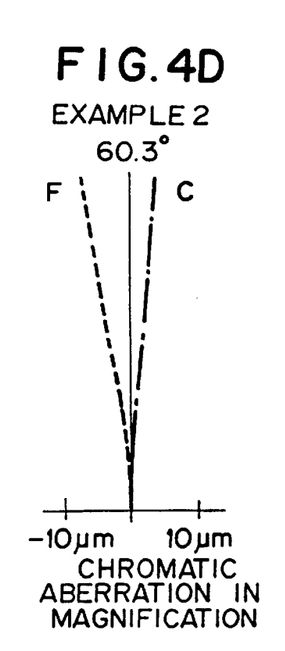
Figure 4E:
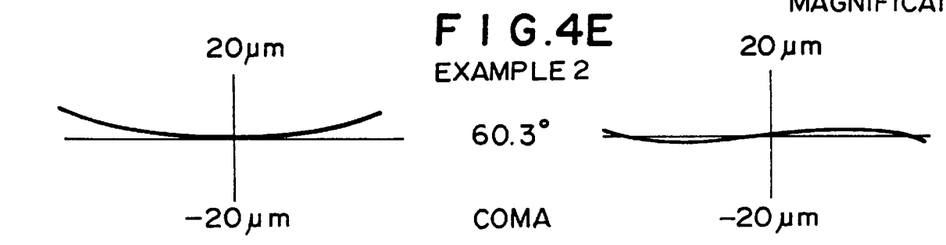

FIG. 3 is a view showing the configuration of the objective lens for an endoscope in accordance with this embodiment.

As depicted, this objective lens has a lens configuration substantially the same as that of Example 1.

Table 3 shows radius of curvature r (mm) of each lens surface, axial surface spacing d (mm) of each lens, and refractive index $n_d$ and Abbe number $v_d$ at d-line of each lens in this example. They are indicated in a manner similar to that of Example 1.

TABLE 3

|    | r        | d      | $n_d$   | $v_d$ |
|----|----------|--------|---------|-------|
| 1  | -22.4079 | 0.4157 | 1.88300 | 41.0  |
| 2  | 0.9677   | 0.1906 |         |       |
| 3  | 2.1408   | 0.4157 | 1.62041 | 60.3  |
| 4  | 1.0150   | 0.9508 |         |       |
| 5  | Stop     | 0.0554 |         |       |
| 6  | ∞        | 1.2747 | 1.62041 | 60.3  |
| 7  | -1.3315  | 0.1386 |         |       |
| 8  | 12.9240  | 1.2471 | 1.62041 | 60.3  |
| 9  | -1.0780  | 0.4850 | 1.84666 | 23.8  |
| 10 | -2.5707  | 1.1107 |         |       |
| 11 | ∞        | 3.8586 | 1.55920 | 53.9  |
| 12 | ∞        |        |         |       |

Table 4 shows the image size, object distance, angle of view, back focus $B_f$, composite focal length and rear-side principal point position of the front-group concave lens system, front-side principal point position and rear-side principal point position of the rear-group convex lens system, and focal lengths of the first lens $L_1$ and the second lens $L_2$ in the front-group concave lens system obtained by the above-mentioned objective lens.

TABLE 4

| Image size | 1.800 mm (diameter) |
|---|---|
| Object distance | 8.3138 mm |
| Angle of view | 120° 27' |
| Bf = 3.468f | |
| Composite focal length of front-group concave lens system | :-0.6897 |
| Rear-side principal point position of front-group concave lens system | :-0.2427 |
| Front-side principal point position of rear-group convex lens system | :1.1873 |
| Rear-side principal point position of rear-group convex lens system | :-1.0382 |

TABLE 4-continued

| | |
|---|---|
| Focal length of first lens in front-group concave lens system | :−1.0419 |
| Focal length of second lens in front-group concave lens system | :−3.6231 |

From these values, dx, $v_d$, and $f_2/f_1$ are calculated as:

$$dx = 0.2427 + 1.0062 + 1.1873$$
$$= 2.4362$$
$$= 3.506 \, | \, f_F |$$

$v_d$=60.3>50×(2.6−1.62041)=49.0

$f_2/f_1$=3.477

It is clear that these values satisfy conditional expressions (1), (2), and (3).

FIGS. 4A to 4E are aberration charts showing various kinds of aberration in the objective lens for an endoscope in accordance with this example. They show the aberration in a manner similar to that of Example 1.

As can be seen from these charts, this example can yield an objective lens for an endoscope having favorable imaging performances extending to the periphery of its visual field.

EXAMPLE 3

Figure 5:
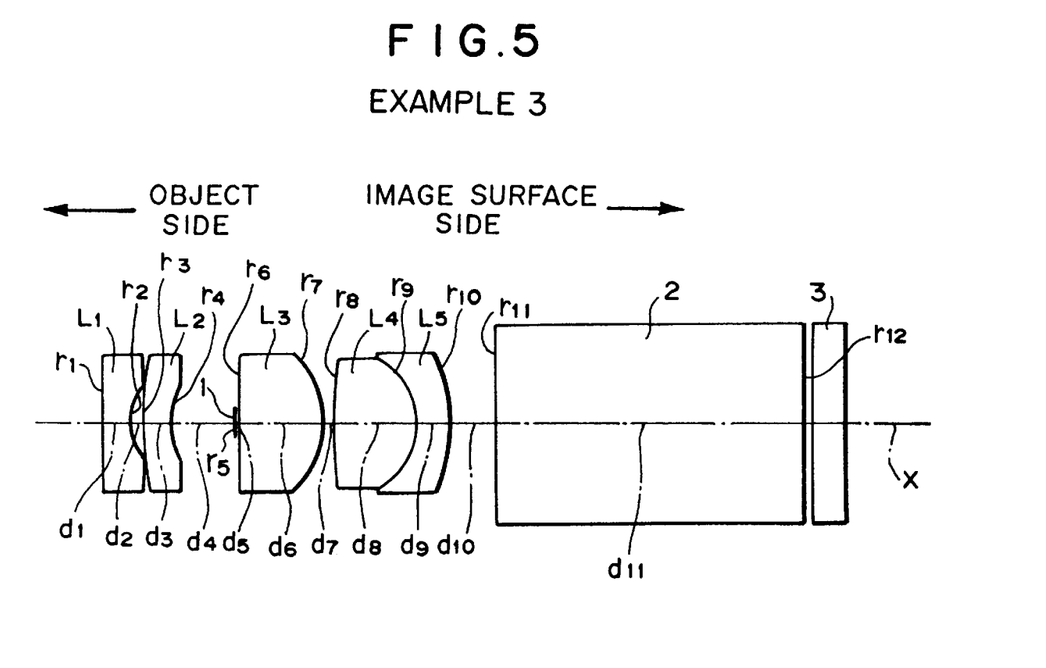
FIG. 5 is a lens configuration view showing the objective lens for an endoscope in accordance with Example 3 of the present invention.
Figure 6A:
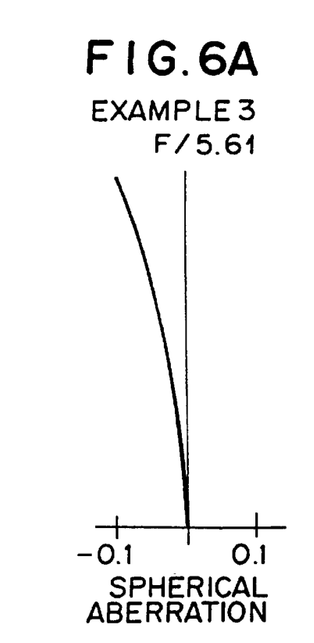
FIGS. 6A to 6E are aberration charts showing various kinds of aberration in the objective lens for an endoscope in accordance with Example 3 of the present invention.
Figures 6B, 6C:
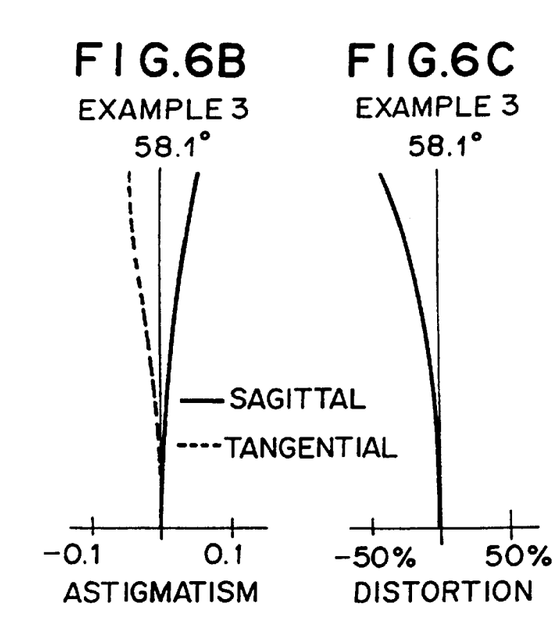
Figure 6D:
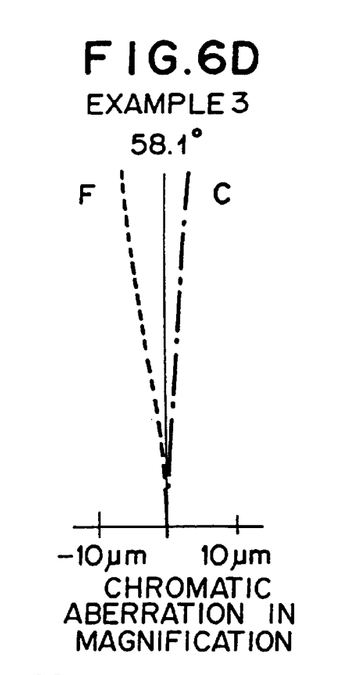
Figure 6E:
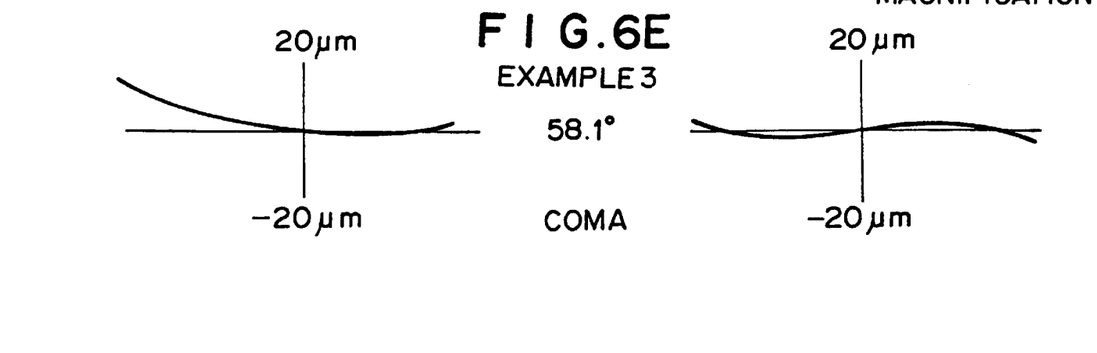

FIG. 5 is a view showing the configuration of the objective lens for an endoscope in accordance with this embodiment.

As depicted, this objective lens has a lens configuration substantially the same as that of Example 1.

Table 5 shows radius of curvature r (mm) of each lens surface, axial surface spacing d (mm) of each lens, and refractive index $n_d$ and Abbe number $v_d$ at d-line of each lens in this example. They are indicated in a manner similar to that of Example 1.

TABLE 5

| | r | d | $n_d$ | $v_d$ |
|---|---|---|---|---|
| 1 | ∞ | 0.4256 | 1.80420 | 46.5 |
| 2 | 0.8513 | 0.1951 | | |
| 3 | 5.2650 | 0.4256 | 1.71301 | 53.9 |
| 4 | 1.4870 | 0.9735 | | |
| 5 | Stop | 0.0568 | | |
| 6 | ∞ | 1.3052 | 1.62041 | 60.3 |
| 7 | −1.3633 | 0.1419 | | |
| 8 | 13.2329 | 1.2769 | 1.62041 | 60.3 |
| 9 | −1.1038 | 0.4966 | 1.84666 | 23.8 |
| 10 | −2.6322 | 0.7106 | | |
| 11 | ∞ | 4.6169 | 1.55920 | 53.9 |
| 12 | ∞ | | | |

Table 6 shows the image size, object distance, angle of view, back focus $B_f$, composite focal length and rear-side principal point position of the front-group concave lens system, front-side principal point position and rear-side principal point position of the rear-group convex lens system, and focal lengths of the first lens $L_1$ and the second lens $L_2$ in the front-group concave lens system obtained by the above-mentioned objective lens.

TABLE 6

| | |
|---|---|
| Image size | 1.800 mm (diameter) |
| Object distance | 8.5126 mm |
| Angle of view | 116° 15' |
| Bf = 3.563f | |
| Composite focal length of front-group concave lens system | :−0.6917 |
| Rear-side principal point position of front-group concave lens system | :−0.2623 |
| Front-side principal point position of rear-group convex lens system | :1.2157 |
| Rear-side principal point position of rear-group convex lens system | :−1.0631 |
| Focal length of first lens in front-group concave lens system | :−1.0585 |
| Focal lenght of second lens in front-group concave lens system | :−3.0493 |

From these values, dx, $v_d$, and $f_2/f_1$ are calculated as:

$$dx = 0.2623 + 1.0303 + 1.2157$$
$$= 2.5083$$
$$= 3.626 \, | \, f_F |$$

$v_d$=53.9>50×(2.6−1.71301)=44.3

$f_2/f_1$=2.881

It is clear that these values satisfy conditional expressions (1), (2), and (3).

FIGS. 6A to 6E are aberration charts showing various kinds of aberration in the objective lens for an endoscope in accordance with this example. They show the aberration in a manner similar to that of Example 1.

As can be seen from these charts, this example can yield an objective lens for an endoscope having favorable imaging performances extending to the periphery of its visual field.

EXAMPLE 4

Figure 7:
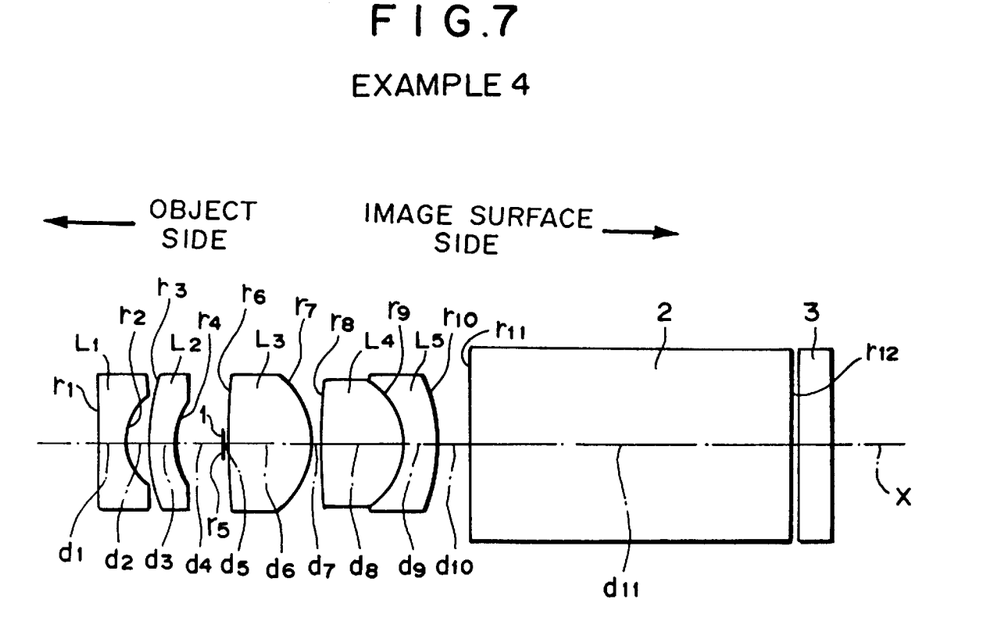
FIG. 7 is a lens configuration view showing the objective lens for an endoscope in accordance with Example 4 of the present invention.
Figure 8A:
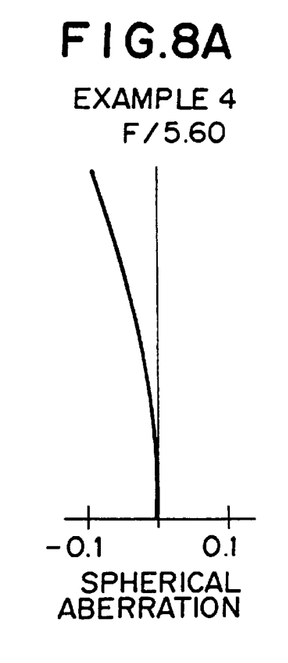
FIGS. 8A to 8E are aberration chart showing various kinds of aberration in the objective lens for an endoscope in accordance with Example 4 of the present invention.
Figures 8B, 8C:
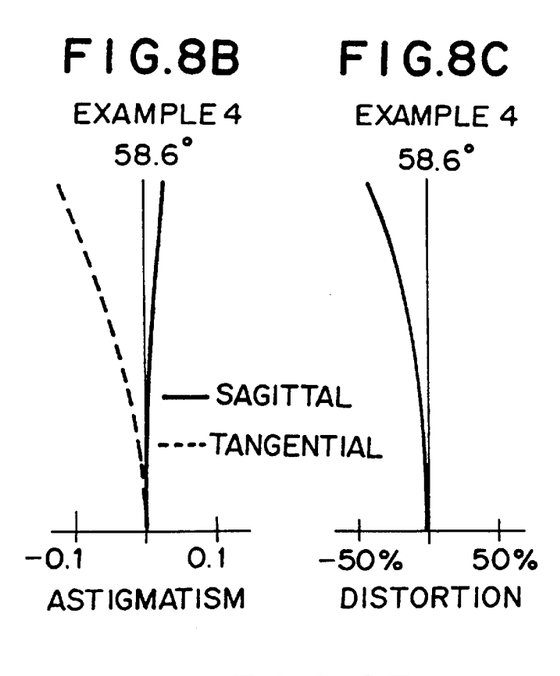
Figure 8D:
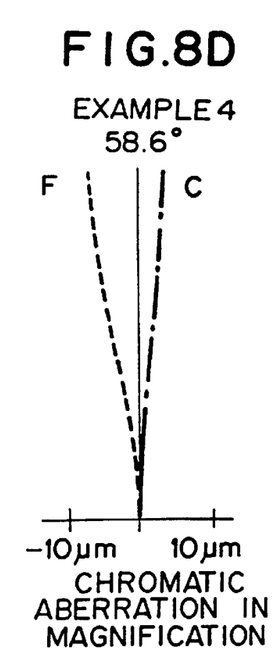
Figure 8E:
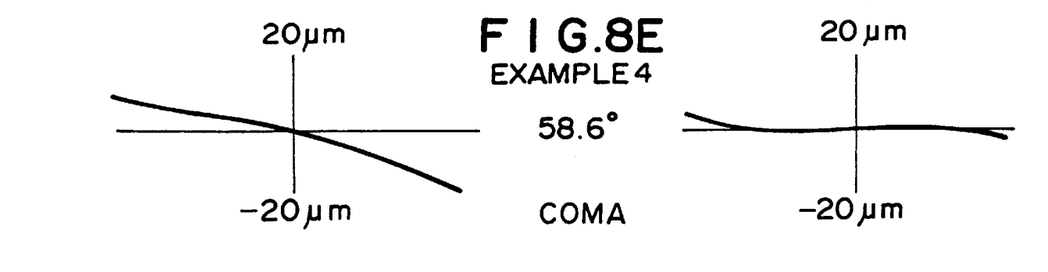

FIG. 7 is a view showing the configuration of the objective lens for an endoscope in accordance with this embodiment.

As depicted, this objective lens has a lens configuration substantially the same as that of Example 1.

Table 7 shows radius of curvature r (mm) of each lens surface, axial surface spacing d (mm) of each lens, and refractive index $n_d$ and Abbe number $v_d$ at d-line of each lens in this example. They are indicated in a manner similar to that of Example 1.

TABLE 7

| | r | d | $n_d$ | $v_d$ |
|---|---|---|---|---|
| 1 | ∞ | 0.4229 | 1.83481 | 42.7 |
| 2 | 0.8458 | 0.3524 | | |
| 3 | 2.8194 | 0.4229 | 1.71301 | 53.9 |
| 4 | 1.1279 | 0.7616 | | |
| 5 | Stop | 0.0564 | | |
| 6 | 11.2775 | 1.2969 | 1.62041 | 60.3 |
| 7 | −1.3546 | 0.1410 | | |
| 8 | 13.1483 | 1.2687 | 1.62041 | 60.3 |
| 9 | −1.1278 | 0.4934 | 1.84666 | 23.8 |
| 10 | −2.6153 | 0.5000 | | |
| 11 | ∞ | 4.8749 | 1.55920 | 53.9 |
| 12 | ∞ | | | |

Table 8 shows the image size, object distance, angle of view, back focus $B_f$, composite focal length and rear-side principal point position of the front-group concave lens system, front-side principal point position and rear-side principal point position of the rear-group convex lens system, and focal lengths of the first lens $L_1$ and the second lens $L_2$ in the front-group concave lens system obtained by the above-mentioned objective lens.

TABLE 8

| Image size | 1.800 mm (diameter) |
|---|---|
| Object distance | 8.4581 mm |
| Angle of view | 117° 16' |
| Bf = 3.517f | |

| | |
|---|---|
| Composite focal length of front-group concave lens system | :−0.6254 |
| Rear-side principal point position of front-group concave lens system | :−0.3173 |
| Front-side principal point position of rear-group convex lens system | :1.1724 |
| Rear-side principal point position of rear-group convex lens system | :−1.1728 |
| Focal length of first lens in front-group concave lens system | :−1.0132 |
| Focal length of second lens in front-group concave lens system | :−2.9431 |

From these values, dx, $v_d$, and $f_2/f_1$ are calculated as:

$$dx = 0.3173 + 1.8180 + 1.1724$$
$$= 2.3077$$
$$= 3.690 \mid f_F \mid$$

$v_d = 53.9 > 50 \times (2.6 - 1.71301) = 44.3$ $f_2/f_1 = 2.905$

It is clear that these values satisfy conditional expressions (1), (2), and (3).

FIGS. 8A to 8E are aberration charts showing various kinds of aberration in the objective lens for an endoscope in accordance with this example. They show the aberration in a manner similar to that of Example 1.

As can be seen from these charts, this example can yield an objective lens for an endoscope having favorable imaging performances extending to the periphery of its visual field.

EXAMPLE 5

Figure 9:
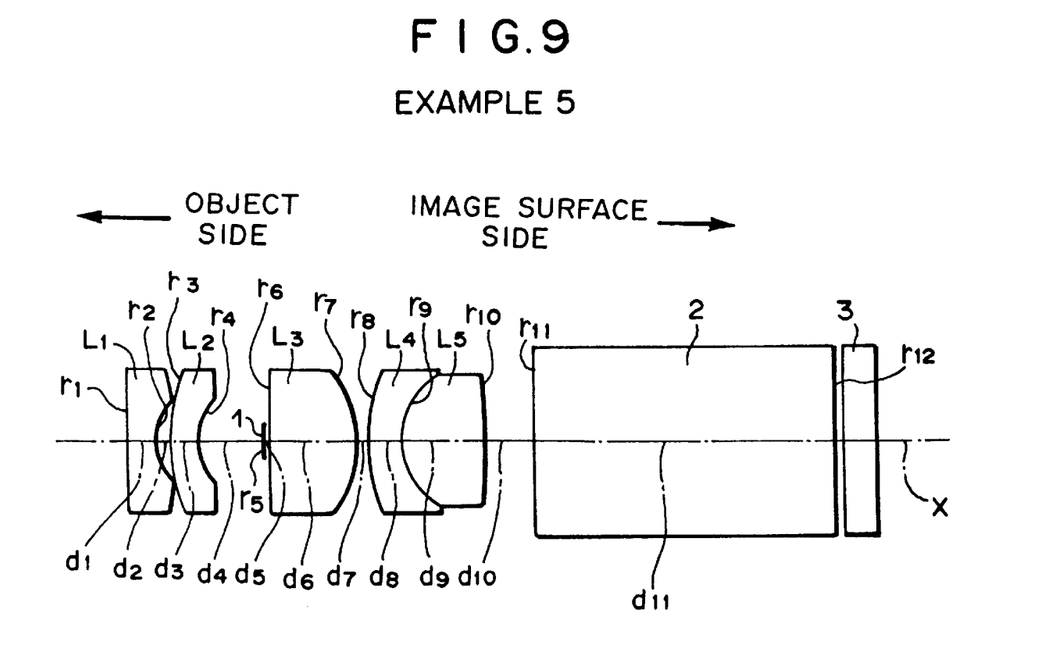
FIG. 9 is a lens configuration view showing the objective lens for an endoscope in accordance with Example 5 of the present invention.
Figure 10A:
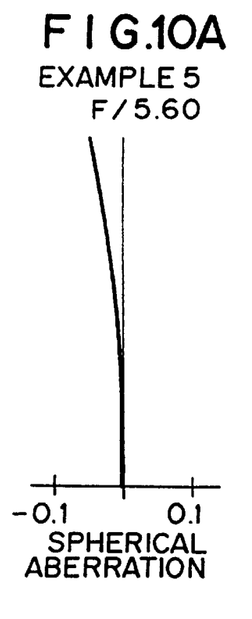
FIGS. 10A to 10E are aberration charts showing various kinds of aberration in the objective lens for an endoscope in accordance with Example 5 of the present invention.
Figures 10B, 10C:
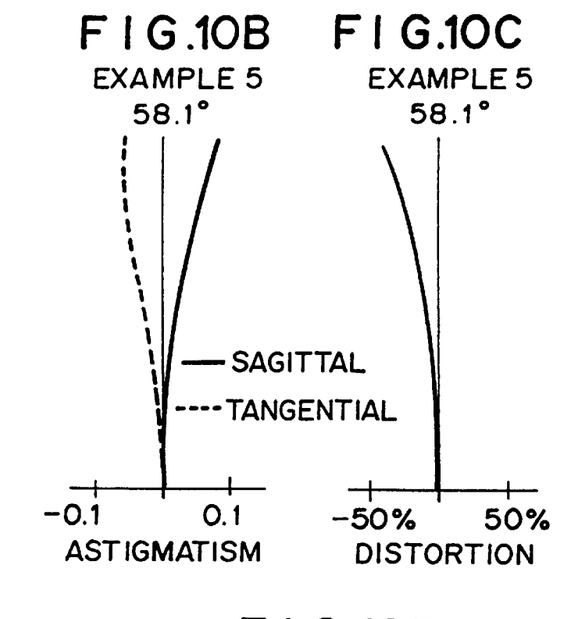
Figure 10D:
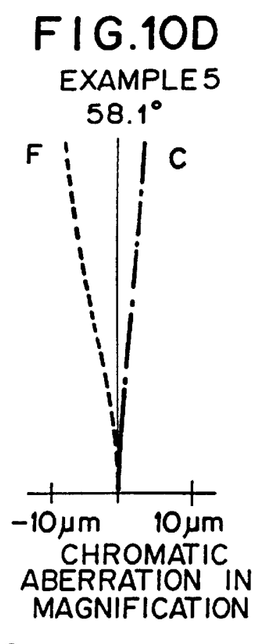
Figure 10E:
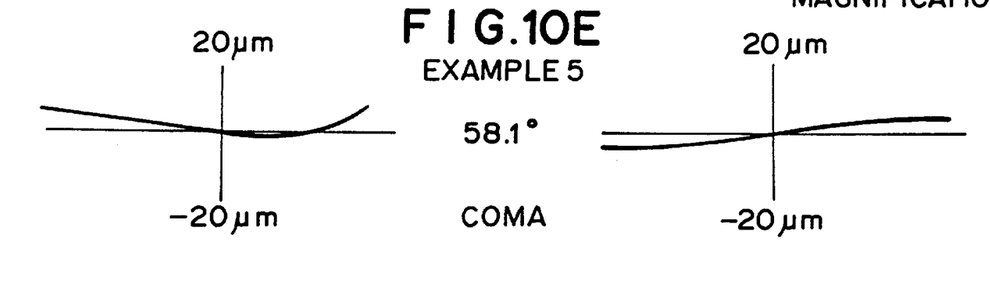

FIG. 9 is a view showing the configuration of the objective lens for an endoscope in accordance with this embodiment.

As depicted, this objective lens has a lens configuration substantially the same as that of Example 1 but differs therefrom in that the fourth lens $L_4$ constituting the cemented rear-group convex lens system is made of a concave lens while the fifth lens $L_5$ is made of a convex lens.

Table 9 shows radius of curvature r (mm) of each lens surface, axial surface spacing d (mm) of each lens, and refractive index $n_d$ and Abbe number $v_d$ at d-line of each lens in this example. They are indicated in a manner similar to that of Example 1.

TABLE 9

| | r | d | $n_d$ | $v_d$ |
|---|---|---|---|---|
| 1 | ∞ | 0.4253 | 1.88830 | 41.0 |
| 2 | 0.8220 | 0.1950 | | |
| 3 | 2.8353 | 0.4253 | 1.62041 | 60.3 |
| 4 | 0.9487 | 0.9727 | | |

TABLE 9-continued

| | r | d | $n_d$ | $v_d$ |
|---|---|---|---|---|
| 5 | Stop | 0.0567 | | |
| 6 | ∞ | 1.3042 | 1.62041 | 60.3 |
| 7 | −1.5070 | 0.1418 | | |
| 8 | 2.6467 | 1.2759 | 1.62041 | 60.3 |
| 9 | 1.1029 | 0.4962 | 1.84666 | 23.8 |
| 10 | −9.8057 | 0.7088 | | |
| 11 | ∞ | 4.4629 | 1.51680 | 64.2 |
| 12 | ∞ | | | |

Table 10 shows the image size, object distance, angle of view, back focus $B_f$, composite focal length and rear-side principal point position of the front-group concave lens system, front-side principal point position and rear-side principal point position of the rear-group convex lens system, and focal lengths of the first lens $L_1$ and the second lens $L_2$ in the front-group concave lens system obtained by the above-mentioned objective lens.

TABLE 10

| Image size | 1.800 mm (diameter) |
|---|---|
| Object distance | 8.5059 mm |
| Angle of view | 116° 9' |
| Bf = 3.541f | |

| | |
|---|---|
| Composite focal length of front-group concave lens system | :−0.5749 |
| Rear-side principal point position of front-group concave lens system | :−0.2425 |
| Front-side principal point position of rear-group convex lens system | :0.8748 |
| Rear-side principal point position of rear-group convex lens system | :−1.1926 |
| Focal length of first lens in front-group concave lens system | :−0.9310 |
| Focal length of second lens in front-group concave lens system | :−2.5153 |

From these values, dx, $v_d$, and $f_2/f_1$ are calculated as:

$$dx = 0.2425 + 1.0294 + 0.8748$$
$$= 2.1467$$
$$= 3.734 \mid f_F \mid$$

$v_d = 60.3 > 50 \times (2.6 - 1.62041) = 49.0$ $f_2/f_1 = 2.702$

It is clear that these values satisfy conditional expressions (1), (2), and (3).

FIGS. 10A to 10E are aberration charts showing various kinds of aberration in the objective lens for an endoscope in accordance with this example. They show the aberration in a manner similar to that of Example 1.

As can be seen from these charts, this example can yield an objective lens for an endoscope having favorable imaging performances extending to the periphery of its visual field.

Comparative Example

Figure 11:
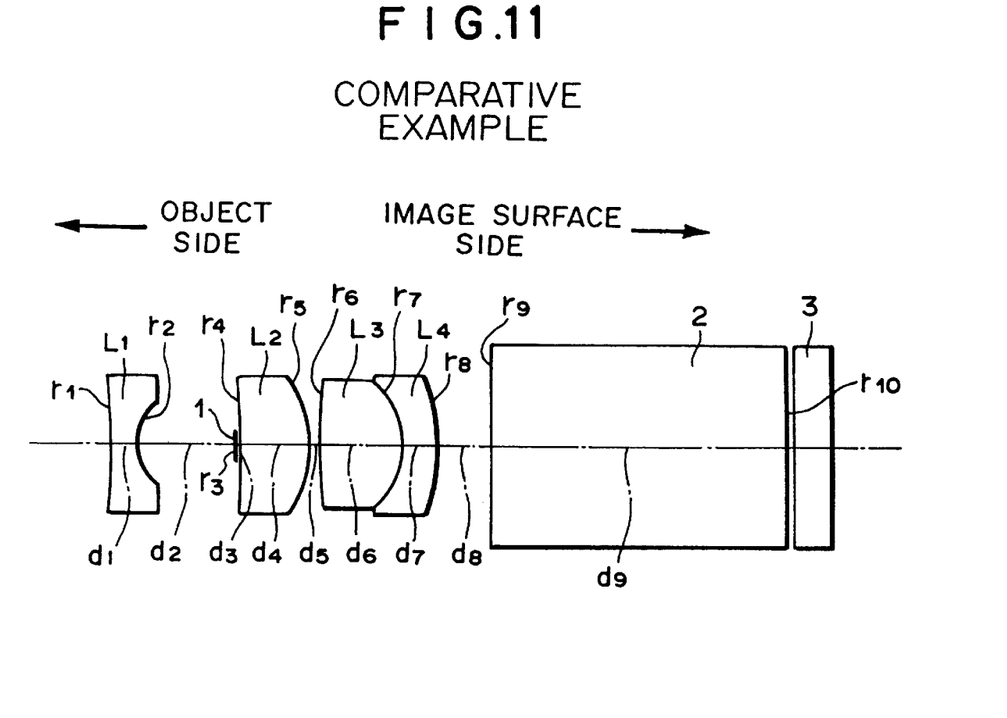
FIG. 11 is a lens configuration view showing an objective lens for an endoscope as a comparative example for each of the above-mentioned examples.
Figures 12A, 12B, 12C:
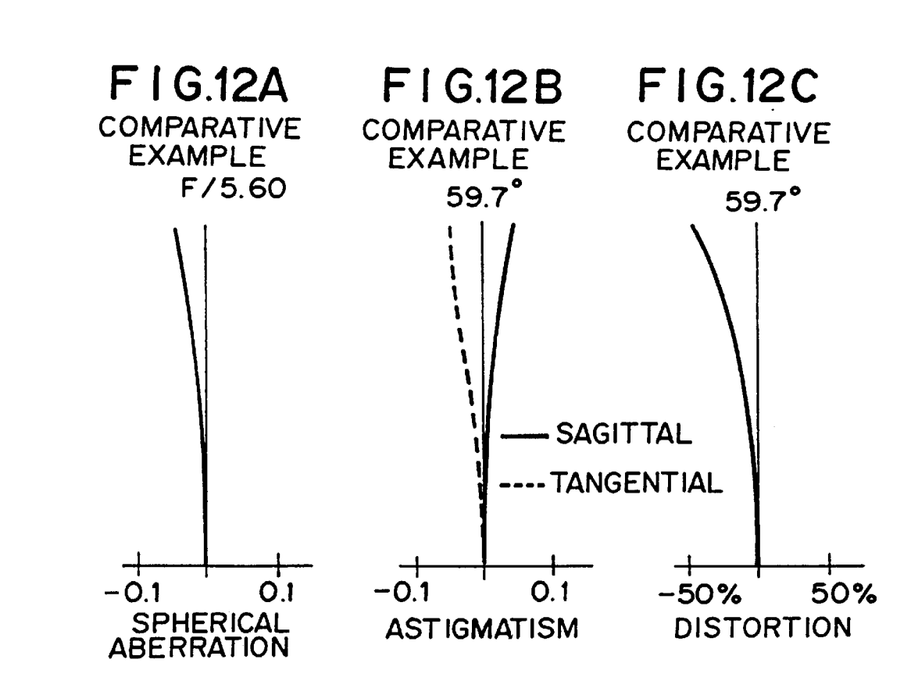
FIGS. 12A to 12E are aberration charts showing various kinds of aberration in the objective lens for an endoscope in accordance with the above-mentioned comparative example.
Figure 12D:
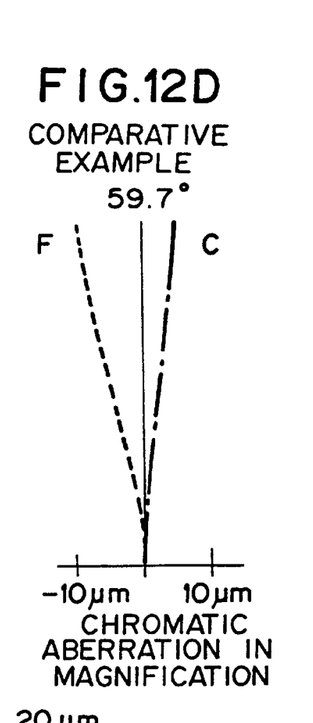
Figure 12E:
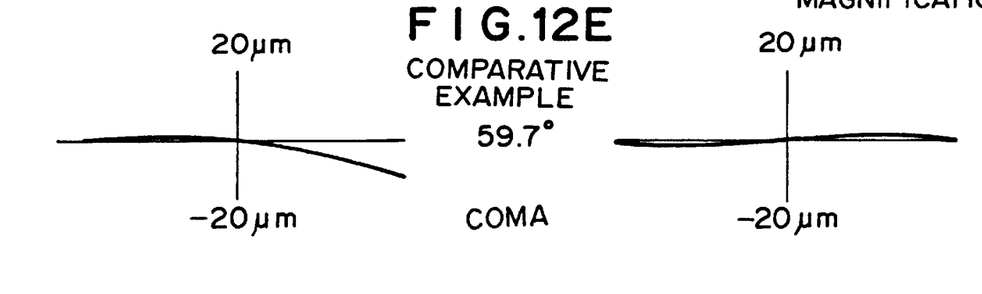

FIG. 11 is a view showing, as a comparative example for the above-mentioned Examples 1 to 5, the configuration of a four-lens objective lens for an endoscope, in which the front-group concave lens system is constituted by a single concave lens.

Table 11 shows radius of curvature r (mm) of each lens surface, axial surface spacing d (mm) of each lens, and refractive index $n_d$ and Abbe number $v_d$ at d-line of each lens in this comparative example. They are indicated in a manner similar to that of Example 1.

TABLE 11

|   | r | d | $n_d$ | $v_d$ |
|---|---|---|---|---|
| 1 | -13.4697 | 0.4041 | 1.88830 | 41.0 |
| 2 | 0.7770 | 1.4816 | | |
| 3 | Stop | 0.0539 | | |
| 4 | -10.7757 | 1.0512 | 1.71301 | 53.9 |
| 5 | -1.7152 | 0.1347 | | |
| 6 | 11.8525 | 1.2123 | 1.71301 | 53.9 |
| 7 | -1.2266 | 0.4714 | 1.84666 | 23.8 |
| 8 | -2.9232 | 0.8113 | | |
| 9 | ∞ | 4.3171 | 1.55920 | 53.9 |
| 10 | ∞ | | | |

Table 12 shows the image size, object distance, angle of view, and back focus $B_f$ obtained by the above-mentioned objective lens.

TABLE 12

| | |
|---|---|
| Image size | 1.740 mm (diameter) |
| Object distance | 8.0818 mm |
| Angle of view | 119° 15' |
| Bf = 3.465f | |

FIGS. 12A to 12E are aberration charts showing various kinds of aberration in the objective lens for an endoscope in accordance with this example. They show the aberration in a manner similar to that of Example 1.

As can also be seen from these charts, each of the above-mentioned Examples 1 to 5 greatly improves chromatic aberration in magnification as compared with the comparative example.

As explained in the foregoing, in the objective lens for an endoscope in accordance with the present invention, when the conditional expression of:

$$dx \geq 3.0 \times |f_F|$$

is satisfied, a long back focus at least three times the composite focal length of the whole objective lens system can be secured.

Consequently, even in the case where a ray direction changing prism is inserted and disposed between the solid-state imaging device axially disposed at the tip portion of the endoscope and the objective lens, the image of an object can be formed on the solid-state imaging device.

Also, since the front-group concave lens system is constituted by two concave lenses, the foregoing effects can be obtained while chromatic aberration in magnification is sufficiently favorably corrected.

Specifically, when conditional expressions of $$v_d > 50 \times (2.6 - n_d)$$

$$2.0 < f_2/f_1 < 4.0$$

are satisfied, the objective lens for an endoscope in accordance with the present invention can achieve a wider angle of view, and correct coma and chromatic aberration in magnification while securing a long back focus.

What is claimed is:

1. An objective lens for an endoscope, said objective lens comprising a front-group concave lens system, a rear-group convex lens system, and an aperture stop disposed therebetween;

wherein said front-group concave lens system is constituted by two concave lenses; and wherein said objective lens satisfies the following conditional expression (1):

$$dx \geq 3.0 \times |f_F| \quad (1)$$

wherein $f_F$ is a composite focal length of said front-group concave lens system; and dx is a distance between a rear-side principal point of said front-group concave lens system and a front-side principal point of said rear-group convex lens system.

2. An objective lens for an endoscope according to claim 1, further satisfying the following conditional expressions (2) and (3):

$$v_d > 50 \times (2.6 - n_d) \quad (2)$$

$$2.0 < f_2/f_1 < 4.0 \quad (3)$$

wherein vd is an Abbe number of the second lens in said front-group concave lens system;

nd is a refractive index of the second lens in said front-group concave lens system at d-line;

$f_1$ is a focal length of the first lens in said front-group concave lens system; and $f_2$ is a focal length of the second lens in said front-group concave lens system.

3. An objective lens for an endoscope according to claim 2, wherein said rear-group convex lens system comprises, successively from the object side, a third convex lens having a surface with a small radius of curvature directed onto the image surface side, and a cemented lens composed of fourth and fifth lenses one of which is constituted by a convex lens while the other is constituted by a concave lens.

4. An objective lens for an endoscope, and objective lens comprising a front-group concave lens system, a rear-group convex lens system, and an aperture stop disposed therebetween;

wherein said front-group concave lens system is constituted by two concave lenses; and wherein said objective lens satisfies the following conditional expressions (4) and (5):

$$v d > 50 \times (2.6 - nd) \quad (4)$$

$$2.0 < f_2/f_1 < 4.0 \quad (5)$$

wherein vd is an Abbe number of the second lens in said front-group concave lens system;

nd is a refractive index of the second lens in said front-group concave lens system at d-line;

$f_1$ is a focal length of the first lens in said front-group concave lens system; and $f_2$ is a focal length of the second lens in said front-group concave lens system.

5. An objective lens for an endoscope according to claim 4, wherein said rear-group convex lens system comprises, successively from the object side, a third convex lens having a surface with a small radius of curvature directed onto the image surface side, and a cemented lens composed of fourth and fifth lenses one of which is constituted by a convex lens while the other is constituted by a concave lens.

6. An objective lens for an endoscope, said objective lens comprising a front-group concave lens system, a rear-group convex lens system, and an aperture stop disposed therebetween;

wherein said front-group concave lens system is constituted by two concave lenses;

wherein said objective lens satisfies the following conditional expression (1):

$$dx \geq 3.0 \times |f_F| \qquad (1)$$

wherein

$f_F$ is a composite focal length of said front-group concave lens system; and     dx is a distance between a rear-side principal point of said front-group concave lens system and a front-side principal point of said rear-group convex lens system; and further satisfying the following conditional expression (2):

$$vd > 50 \times (2.6 - nd) \qquad (2)$$

wherein vd is an Abbe number of the second lens in said front-group concave lens system;

nd is a refractive index of the second lens in said front-group concave lens system at d-line.

7. An objective lens for an endoscope, said objective lens comprising a front-group concave lens system, a rear-group convex lens system, and an aperture stop disposed therebetween;

wherein said front-group concave lens system is constituted by two concave lenses;

wherein said objective lens satisfies the following conditional expression (1):

$$dx \geq 3.0 \times |f_F| \qquad (1)$$

wherein

$f_F$ is a composite focal length of said front-group concave lens system; and     dx is a distance between a rear-side principal point of said front-group concave lens system and a front-side principal point of said rear-group convex lens system; and further satisfying the following conditional expression (2):

$$2.0 < f_2/f_1 < 4.0 \qquad (2)$$

wherein

$f_1$ is a focal length of the first lens in said front-group concave lens system; and     $f_2$ is a focal length of the second lens in said front-group concave lens system.

8. An objective lens for an endoscope according to claim 6, wherein said rear-group convex lens system comprises, successively from the object side a third convex lens having a surface with a small radius of curvature directed onto the image surface side, and a cemented lens composed of fourth and fifth lenses one of which is constituted by a convex lens while the other is constituted of a concave lens.

9. An objective lens for an endoscope according to claim 7, wherein said rear-group convex lens system comprises, successively from the object side a third convex lens having a surface with a small radius of curvature directed onto the image surface side, and a cemented lens composed of fourth and fifth lenses one of which is constituted by a convex lens while the other is constituted of a concave lens.

10. An objective lens for an endoscope according to claim 1, wherein said rear-group convex lens system comprises, successively from the object side a third convex lens having a surface with a small radius of curvature directed onto the image surface side, and a cemented lens composed of fourth and fifth lenses one of which is constituted by a convex lens while the other is constituted of a concave lens.

\* \* \* \* \*